Jan. 6, 1970 D. L. DAVEY 3,488,450

SENDER FOR TRANSMITTING TRAINS OF PULSES

Filed Dec. 2, 1966 2 Sheets-Sheet 1

INVENTOR
D. L. DAVEY
BY
Harry L. Newman
ATTORNEY

Jan. 6, 1970 D. L. DAVEY 3,488,450

SENDER FOR TRANSMITTING TRAINS OF PULSES

Filed Dec. 2, 1966

2 Sheets-Sheet 2

United States Patent Office 3,488,450

Patented Jan. 6, 1970

3,488,450

SENDER FOR TRANSMITTING TRAINS OF PULSES

Donald L. Davey, Galesburg, Ill., assignor to American Telephone and Telegraph Company, New York, N.Y., a corporation of New York Filed Dec. 2, 1966, Ser. No. 598,731

Int. Cl. H04m *1/26*

U.S. Cl. 179—90 8 Claims

ABSTRACT OF THE DISCLOSURE

A pulse transmitter comprising a counter having ten serially connected stages, each stage being turned on responsive to the operation of its corresponding one of ten digit selecting switches. An oscillator, coupled to the counter, is turned on responsive to the operation of any digit selecting switch and provides ten pulses per second for stepping the counter and for turning on a multivibrator coupled to the oscillator. A transistor switch, connected across a telephone line, is coupled to the multivibrator and is turned off when the latter is on thereby interrupting the line and transmitting a pulse thereover.

Figure 1:
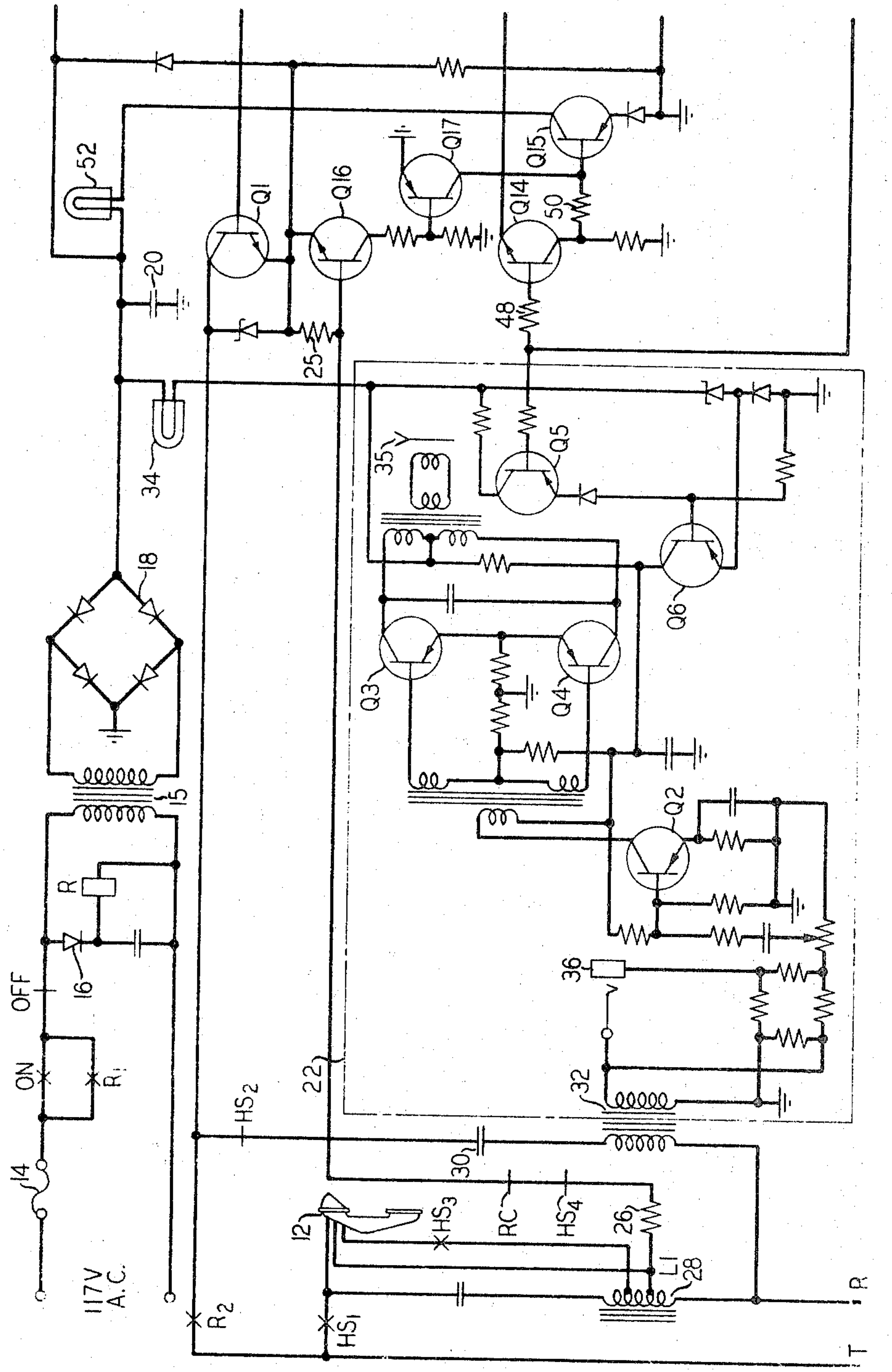

This invention relates to senders for transmitting trains of pulses such as those employed in the dialing of a telephone number.

An object of this invention is to provide a novel dial pulse transmitter.

A further object of this invention is to provide a telephone set usable by disabled persons.

These and other objects of this invention are achieved in an illustrative embodiment wherein the pulse transmitter comprises a counter having ten counting stages connected in series. Each counting stage is associated with an individual digit selecting switch and the digit selected by each switch corresponds to the position of its associated stage in the series. The operation of a digit selecting switch turns on the stage of the counter associated therewith and turns on an oscillator coupled to the counter. The oscillator provides ten pulses per second and each pulse steps the counter by turning off the stage turned on and turning on the preceding stage of the series. The oscillator itself turns off when the first counting stage in the series turns off.

The oscillator is also coupled to a monostable multivibrator having an operate time of about 50 milliseconds, and each pulse of the oscillator turns on the multivibrator. The multivibrator is coupled in turn to a normally on transistor switch connected across a telephone line. The transistor switch is turned off when the multivibrator is turned on, interrupting the telephone line and transmitting a pulse thereover.

A complete understanding of the invention and of these and other features and advantages thereof may be gained from consideration of the following detailed description which in conjunction with the accompanying drawing discloses one embodiment of the invention. It is to be expressly understood, however, that the drawing and description are not to be construed as defining the limits of the invention.

Figure 2:
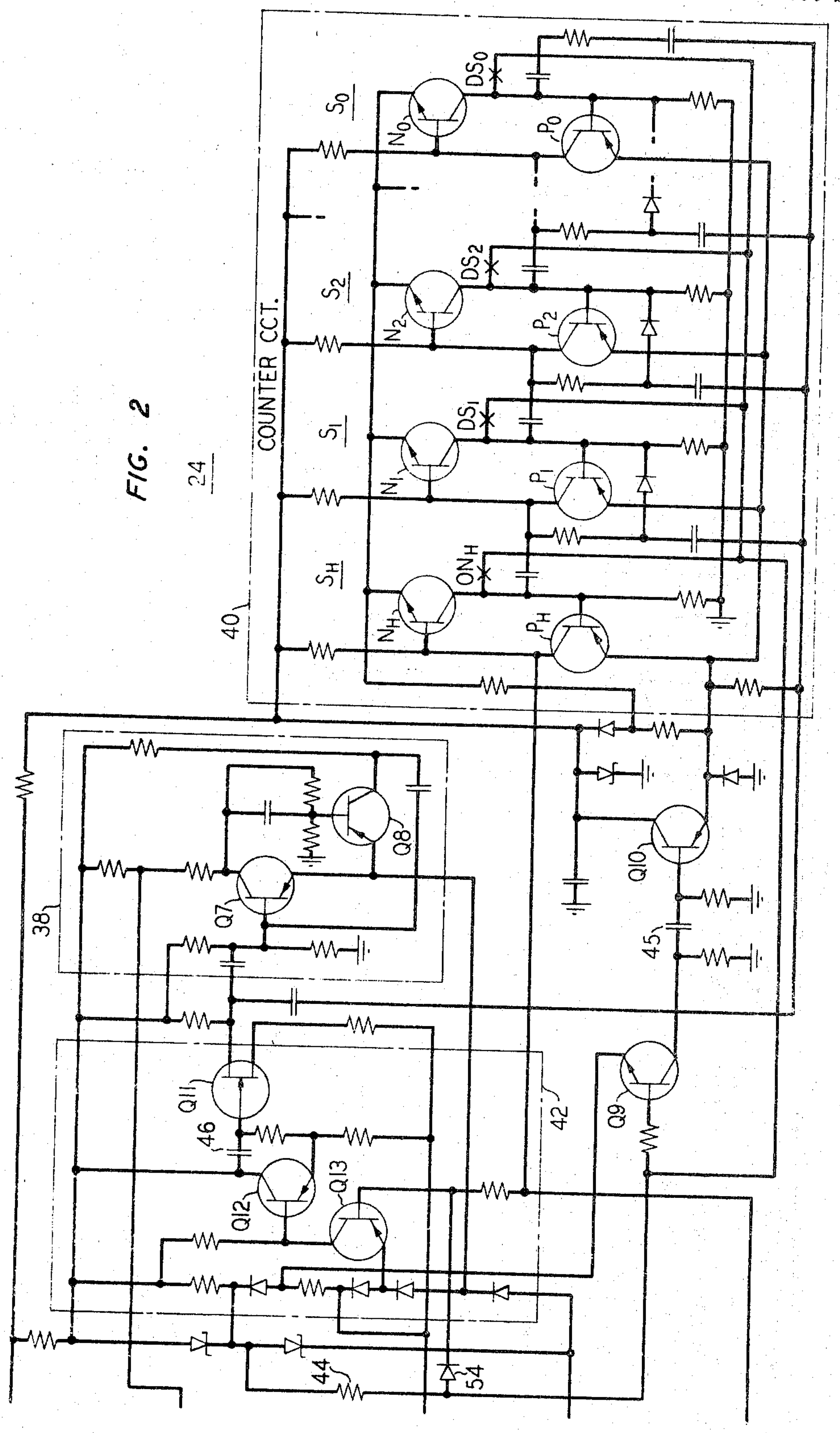

In the drawing:

FIGS. 1 and 2 are a schematic circuit diagram of a telephone set embodying the pulse transmitter of the present invention.

Referring to FIGS. 1 and 2, the telephone set includes a handset 12 that when not in use rests on a hook switch that has four pairs of contacts $HS_1$ through $HS_4$. The contacts $HS_1$ and $HS_3$ are normally open while the contacts $HS_2$ and $HS_4$ are normally closed, the normal condition being with the handset resting on the hook switch.

The telephone set also includes a normally open monostable power-on switch ON and a normally closed monostable power-off switch OFF connected in series with a fuse 14 and the primary of a stepdown transformer 15 across a conventional alternating current power source. In addition, a rectifying diode 16 in series with a relay R is connected in parallel with the primary of the transformer 15, and thus when the power-on switch ON is closed, power is supplied to both the transformer and the relay.

The transformer 15 substantially reduces the voltage, and a full wave bridge rectifier 18 and capacitor 20 connected to the secondary of the transformer convert the output of the transformer to direct current. This low voltage direct current provides the power for an audio circuit 22 and a pulse transmitter circuit 24. In addition, it provides forward bias for a line transistor Q1.

The relay R when energized closes two pair of normally open contacts $R_1$ and $R_2$. The contacts $R_1$ are connected in parallel with the normally open contacts ON of the power-on switch, and thus the closure of the contacts $R_1$ maintains the relay energized and power supplied to the transformer 15 when the power-on switch is permitted to return to its normally open condition.

The contacts $R_2$ are connected in series with the line transistor Q1, a resistor 25, a normally closed monostable recall switch RC, the normally closed hook switch contact $HS_4$, a resistor 26, and a portion of an inductor 28 across a telephone line. The closure of the contacts $R_2$ turns on the line transistor Q1, and as a path is then provided across the telephone line, the telephone line is seized. The contacts $R_2$ are also connected in series with the normally closed hook switch contacts $HS_2$, a capacitor 30, and the primary of a transformer 32 across the telephone line. The secondary of the transformer 32 is in the audio circuit 22, and thus any alternating current signals on the line are coupled into the audio circuit.

Power for the audio circuit 22 is provided through a power-on lamp 34, the illumination of the lamp providing a visual indication that power is being applied to the telephone set. The audio circuit 22 comprises a preamplifier section, including the secondary of the transformer 32 and a transistor Q2, coupled to a power section, including transistors Q3 and Q4. The power section drives a speaker 35 over which audible signals received on the telephone line, such as the dial tone, ringing and busy signals, are heard. The audio circuit 22 also includes a jack 36 to which a microphone coupled to a speech amplifier may be connected if hands-free operation is desired in conversing with the called party.

Finally, the audio circuit 22 includes a squelch section comprising transistors Q5 and Q6 under the control of the pulse transmitter circuit 24. Normally, the transistor Q5 has a reverse bias applied to it, which in turn reverse biases the transistor Q6. Full voltage is therefore normally applied to the pre-amplifier and power sections, providing full output at the speaker 35. When, however, the pulse transmitter 24 is of the telephone set is in operation, the transitor Q5 is forward biased. With the transistor Q5 conducting, the transistor Q6 is turned on and this lowers the pre-amplifier supply voltage. The output at the speaker 35 is thereby materially lowered when pulses are being transmitted over the telephone line.

The pulse transmitter circuit 24 comprises a monostable multivibrator 38, a counter 40, and a relaxation oscillator 42. The monostable multivibrator 38 is of standard design, and it includes a pair of transistors Q7 and Q8, the transistor Q7 being normally on. The multivibrator 38 has an operate time of approximately 50 milliseconds.

The counter 40 has eleven stages, ten for counting and one for holding. The counting stages are designated $S_1$ through $S_O$ and the holding stage is designated $S_H$. Each stage comprises a PNP transistor designated $P_X$ and an NPN transistor designated $N_X$, the suffix X in each case corresponding to the stage with which the transistors are associated.

The transistors $N_X$ and $P_X$ of each stage are connected back to back, the collector of one transistor being connected to the base of the other transistor. The base of each transistor $N_X$ is connected through a resistor to negative voltage while the base of each transistor $P_X$ is connected through a resistor to ground. In addition, in each of the counting stages $S_1$ through $S_O$ a resistor in series with a diode is connected between the collector and base of the transistor $P_X$, and the collector of the transistor $P_X$ of each stage is coupled to the base of the transistor $P_X$ of the preceding stage by a capacitor.

The base of the transistor $P_X$ of each stage is connectable to negative potential by an individual normally open switch associated therewith. The counting stages $S_1$ through $S_O$ are respectively associated with digit selecting switches $DS_1$ through $DS_O$ while the holding stage $S_H$ is associated with a pair of contacts $ON_H$ of the power-on switch. The closure of any of these switches applies a forward bias to the transistor $P_X$ of the stage with which it is associated, turning the transistor on. The collector current of the turned on transistor $P_X$ provides base current for the transistor $N_X$ of the same stage, and the latter turns on. Thereafter the collector current of the turned on transistor $N_X$ provides base current for the turned on transistor $P_X$, and thus both remain on when the associated switch is permitted to open.

Furthermore, the closure of any of the digit selecting switches $DS_1$ through $DS_O$ or the power-on switch $ON_H$ forward biases a transistor Q9, the current flow through a resistor 44 connected in series with the switches lowering the voltage at the base of the transistor. The transistor Q9 conducts, and a capacitor 45 connected between the collector of the transistor Q9 and the base of a transistor Q10 is charged. The charging of the capacitor 45 turns on the transistor Q10, and when the transistor Q10 is on, the supply voltage for the counter 40 is reduced to a point that turns off any stage of the counter that may be on. The charging of the capacitor 45 is momentary and when it is completed, the transistor Q10 turns off. The supply voltage for the counter 40 then returns to its normal level, and the stage associated with the closed switch is turned on. The transistors Q9 and Q10 thus serve to reset the counter.

From the foregoing it is seen that when the power-on switch is actuated to apply power to the telephone set, the holding stage $S_H$ is turned on by the closure of the normally open contacts $ON_H$.

When the holding stage $S_H$ is on, the relaxation oscillator 42 is turned off. The relaxation oscillator 42 comprises a unijunction transistor Q11 that operates under the control of a pair of transistors Q12 and Q13 and a RC timing network 46. The transistor $P_H$ when on applies a reverse bias to the base of the transistor Q13. The transistor Q13 does not conduct and as a result a forward bias is applied to the base of the transistor Q12, the collector of transistor Q13 being connected to the base of the transistor Q12 and both being connected to negative power supply. With transistor Q12 conducting, a short is effectively placed across the RC timing network 46, and the transistor Q11 is off.

In addition, when the holding stage $S_H$ is on, the collector current of the transistor $P_H$ forward biases a transistor Q14, the collector of the transistor $P_H$ being connected to the base of the transistor Q14 through a resistor 48. Transistor Q14 turns on, and its collector current provides base current through a resistor 50 for a transistor Q15, turning the latter transistor on. The transistor Q15 is connected in series with a ready lamp 52 between the power supply and ground, and thus the turning on of the transistor Q15 results in the illumination of the ready lamp. The ready lamp 52, when illuminated indicates to the user of the telephone set that a digit selecting switch $DS_X$ may be actuated to operate the call transmitter 24.

Now to briefly recapitulate, when the power-on switch is actuated to close the normally open contacts ON and $ON_H$ thereof, power is applied to the audio and pulse transmitter circuits 22 and 24, and the telephone line is seized. In addition, the holding stage $S_H$ of the counter 40 is turned on and the power and ready lamps 34 and 52 are illuminated.

Dial tone when placed on the telephone line is heard over the speaker 35 of the audio circuit 22, and the user, upon hearing dial tone, actuates the digit selecting switch $DS_X$ corresponding with the first digit of the desired telephone number. Assuming that the first digit of the telephone number is a 2, he actuates the digit selecting switch $DS_2$ to close the normally open contacts thereof. As hereinbefore described, this turns off the stage that is on, in this case the holding stage $S_H$, and turns on the stage associated with the actuated digit selecting switch, in this case the counting stage $S_2$.

The turning off of the holding stage $S_H$ removes the forward bias from the transistor Q14. The transistor Q14 stops conducting and this turns off the transistor Q15 and thereby extinguishes the ready lamp. The turning off of the holding stage $S_H$ does not by itself, however, remove the reverse bias from the base of the transistor Q13 of the oscillator 42. As long as the digit selecting switch $DS_2$ remains closed, reverse bias is applied to the base of the transistor Q13 through a diode 54. But when the digit selecting switch $DS_2$ is permitted to open, a forward bias is applied to the transistor Q13 and it turns on. A reverse bias is thereupon applied to the transistor Q12 and it ceases to conduct. This permits the capacitor of the RC timing network 46 to charge and the transistor Q11 commences to oscillate. The RC timing network 46 provides the transistor Q11 with an operate rate of 10 pulses per second.

Each time the transistor Q11 fires, a positive pulse is coupled from the top base thereof to the base of transistor Q7 of the monostable multivibrator 38. The transistor Q7 turns off and the transistor Q8 turns on. This results in a reverse bias being applied to the line transistor Q1 and it is turned off. The telephone line is thereby interrupted and a pulse transmitted thereover, the pulse width being established by the operate time of the monostable multivibrator 38.

Each time the transistor Q11 fires, a positive pulse is also coupled from the top base thereof to the counter 40. Thus, the first positive pulse is applied to the base of the transistor $P_2$ through the capacitor and diode connected thereto and the transistor is turned off, turning off the counting stage $S_2$. The negative voltage at the collector of the thransistor $P_2$ rises whereby a negative pulse is applied to the base of the transistor $P_1$ through coupling capacitor therebetween. The counting stage $S_1$ is thereby turned on.

In the same manner, the second positive pulse from the transistor Q11 turns off the counting stage $S_1$ and turns on the holding stage $S_H$. As described above, the turning on of the holding stage $S_H$ turns the relaxation oscillator 42 off and thus terminates the pulsing of the telephone line. It also results in the illumination of the ready lamp 52, informing the user of the telephone set that the transmission of a train of pulses corresponding to the selected digit has been completed. The user then operates and releases the digit selecting switch $DS_X$ corresponding to the second digit of the desired telephone number and continues in this manner until all of the digits have been sent.

If the user should make a mistake and accidentally actuate the wrong digit selecting switch $DS_X$ he need only actuate the power-on switch and then actuate the recall switch RC. The actuation of the power-on switch closes and opens the normally open contacts $ON_H$, turning off the turned on counting stage and turning on the holding stage $S_H$. The actuation of the recall switch RC drops the telephone line and then re-seizes it. The user may then commence to call the desired number again.

After all the digits have been transmitted, either the ringing signal or the busy signal will be heard over the speaker 35 of the audio circuit 22. Furthermore, if the line current is reversed when the called party answers, the emitter to collector junction of the line transistor Q1 is forward biased and reverse current flow through the resistor 25 forward biases a transistor Q16. With the transistor Q16 conducting, a transistor Q17 is forward biased, and when the transistor Q17 conducts it shorts out the transistor Q14 whereupon the transistor Q15 is reverse biased. This extinguishes the ready lamp 52 and thereby informs the user that the called station has answered.

The user then removes the handset 12 from the hook switch and converses with the answering party. The removal of the handset causes the hook switch contacts $HS_1$ and $HS_3$ to close and the contacts $HS_2$ and $HS_4$ to open. The transmitter and receiver of the handset 12 are thereby connected across the telephone line and the audio and pulse transmitter circuits 22 and 24 are disconnected from the telephone line.

When the telephone conversation is completed, the user returns the handset 12 to the hook switch and actuates the power-off switch OFF. The energizing path for the relay R is thereby broken, and the contacts $R_1$ and $R_2$ of the relay open to respectively disconnect the telephone set from the source of alternating current power and drop the telephone line.

Although a specific embodiment of the invention has been shown and described, it will be understood that it is but illustrative and that various modifications may be made therein without departing from the scope and spirit of this invention as defined in the appended claims.

What is claimed is:

1. A sender for transmitting trains of digit pulses comprising:

ten digit selecting switches;

a counter having ten stages connected in series, each stage being associated with an individual digit selecting switch, and an individual stage being turned on responsive to the operation of the digit selecting switch associated therewith;

an oscillator turned on responsive to the operation of any one of the digit selecting switches, the oscillator being coupled to the counter and each oscillation of the oscillator causing the turned on stage of the counter to turn off and the preceding stage of the counter to turn on, the turning off of the first stage of the counter resulting in the turn off of the oscillator;

a monostable multivibrator coupled to the oscillator, the multivibrator turning on responsive to each oscillation of the oscillator; and a transistor switch connected in an outgoing circuit and coupled to the multivibrator, the transistor switch being turned off during the time the multivibrator is turned on.

2. A sender as in claim 1 wherein the ten stages associated with the digit selecting switches are counting stages and the counter further includes a holding stage, the holding stage being turned on responsive to the turn off of the first counting stage in the series and turned off responsive to the actuation of a digit selecting switch, and the oscillator being turned off responsive to the turn on of the holding stage.

3. A sender as in claim 2 further including a ready lamp that is illuminated responsive to the turning on of the holding stage and extinguished responsive to the turning off of the holding stage, the ready lamp serving to inform the user of the sender when the transmission of a train of pulses is complete.

4. A sender as in claim 1 wherein the oscillator is a relaxation oscillator comprising an unijuntcion transistor.

5. A sender as in claim 3 wherein the transistor switch is connetced across a telephone line and the oscillator is a relaxation oscillator that operates at ten pulses per second, the transistor switch interrupting the telephone line during each operation of the multivibrator to transmit pulses over the telephone line.

6. A sender as in claim 5 further including an audio circuit coupled to the telephone line.

7. A sender as in claim 6 wherein the audio circuit has a speaker over which audible signal transmitted over the telephone line are heard.

8. A sender as in claim 7 wherein the audio circuit includes means for reducing the output of the speaker while pulses are being transmitted over the telephone line.

References Cited

UNITED STATES PATENTS 3,011,028 11/1961 Boswau.
2,794,976 6/1957 Faulkner.

KATHLEEN H. CLAFFY, Primary Examiner

B. P. SMITH, Assistant Examiner

U.S. Cl. X.R.

340—168